(12) United States Patent
Long et al.

(10) Patent No.: US 10,514,495 B2
(45) Date of Patent: Dec. 24, 2019

(54) SINGLE-MODE FIBER WITH ULTRA LOW ATTENUATION

(71) Applicant: YANGTZE OPTICAL FIBRE AND CABLE JOINT STOCK LIMITED COMPANY, Wuhan, Hubei (CN)

(72) Inventors: Shengya Long, Hubei (CN); Jihong Zhu, Hubei (CN); Lei Zhang, Hubei (CN); Jun Wu, Hubei (CN); Rui Zhang, Hubei (CN); Ruichun Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 15/785,923

(22) Filed: Oct. 17, 2017

(65) Prior Publication Data
US 2018/0039020 A1    Feb. 8, 2018

Related U.S. Application Data

(63) Continuation of application No. PCT/CN2015/096109, filed on Dec. 1, 2015.

(30) Foreign Application Priority Data

Apr. 28, 2015 (CN) .......................... 2015 1 0206602

(51) Int. Cl.
     *G02B 6/036*      (2006.01)
     *C03C 13/04*      (2006.01)
     *G02B 6/02*      (2006.01)

(52) U.S. Cl.
CPC ........ *G02B 6/03683* (2013.01); *C03C 13/046* (2013.01); *G02B 6/02009* (2013.01);
(Continued)

(58) Field of Classification Search
CPC ............ G02B 6/03683; G02B 6/02009; G02B 6/02266; G02B 6/036; C03C 13/046
See application file for complete search history.

(56) References Cited

U.S. PATENT DOCUMENTS

2007/0003198 A1* 1/2007 Gibson ............. C03B 37/01211
                                                     385/123
2010/0022533 A1   1/2010   Chen et al.
(Continued)

FOREIGN PATENT DOCUMENTS

CN         102099711 A      6/2011
CN         103345017 A      10/2013
(Continued)

OTHER PUBLICATIONS

Office Action issued by the State Intellectual Property Office of the Peoples Republic of China dated May 15, 2017 for CN 201510206602.7.

(Continued)

*Primary Examiner* — Chris H Chu
(74) *Attorney, Agent, or Firm* — Tim Tingkang Xia, Esq.; Locke Lord LLP

(57) ABSTRACT

A single-mode fiber with ultralow attenuation includes a core layer and cladding layers. The cladding layers includes an inner cladding layer surrounding the core layer, a trench cladding layer surrounding the inner cladding layer, an auxiliary outer cladding layer surrounding the trench cladding layer, and an outer cladding layer surrounding the auxiliary cladding layer. The core layer has a radius of 3.9-4.8 μm and a relative refractive index difference of −0.08% to 0.10%. The inner cladding layer has a radius of 9-14 μm and a relative refractive index difference of −0.40% to −0.15%. The trench cladding layer has a radius of 13-25 μm and a refractive index difference of −0.7% to −0.3%. The auxiliary outer cladding layer has a radius of 30-50 μm and a relative refractive index difference of −0.4% to −0.15%. The outer cladding layer is a pure silicon dioxide glass layer.

3 Claims, 1 Drawing Sheet

(52) U.S. Cl.
CPC ......... *G02B 6/02266* (2013.01); *G02B 6/036* (2013.01); *C03C 2213/00* (2013.01)

(56) References Cited

U.S. PATENT DOCUMENTS

2014/0161404 A1   6/2014  Fini
2017/0176674 A1*  6/2017  Long .................. G02B 6/03683

FOREIGN PATENT DOCUMENTS

| CN | 103454719 A | 12/2013 |
| CN | 103995314 A | 8/2014 |
| CN | 104360434 A | 2/2015 |
| CN | 104459876 A | 3/2015 |
| CN | 104777553 A | 7/2015 |
| EP | 2533082 A1 | 12/2012 |
| EP | 2713188 A1 | 4/2014 |
| JP | 2005195921 A | 7/2005 |

OTHER PUBLICATIONS

International Search Report (ISR) issued by the State Intellectual Property Office of the Peoples Republic of China dated Feb. 25, 2016 for PCT/CN2015/096109, China.
European Patent Office, "Extended European Search Report for EP Application No. 15 890 627.1", Berlin, Germany, Mar. 5, 2018.
Japanese Patent Office, "1st Office Action for JP Application No. 2017-546604", Japan, Aug. 7, 2018.
State Intellectual Property Office of People's Republic of China, "Notice of Allowance for CN Application No. 201502066027", China, Oct. 24, 2017.

* cited by examiner

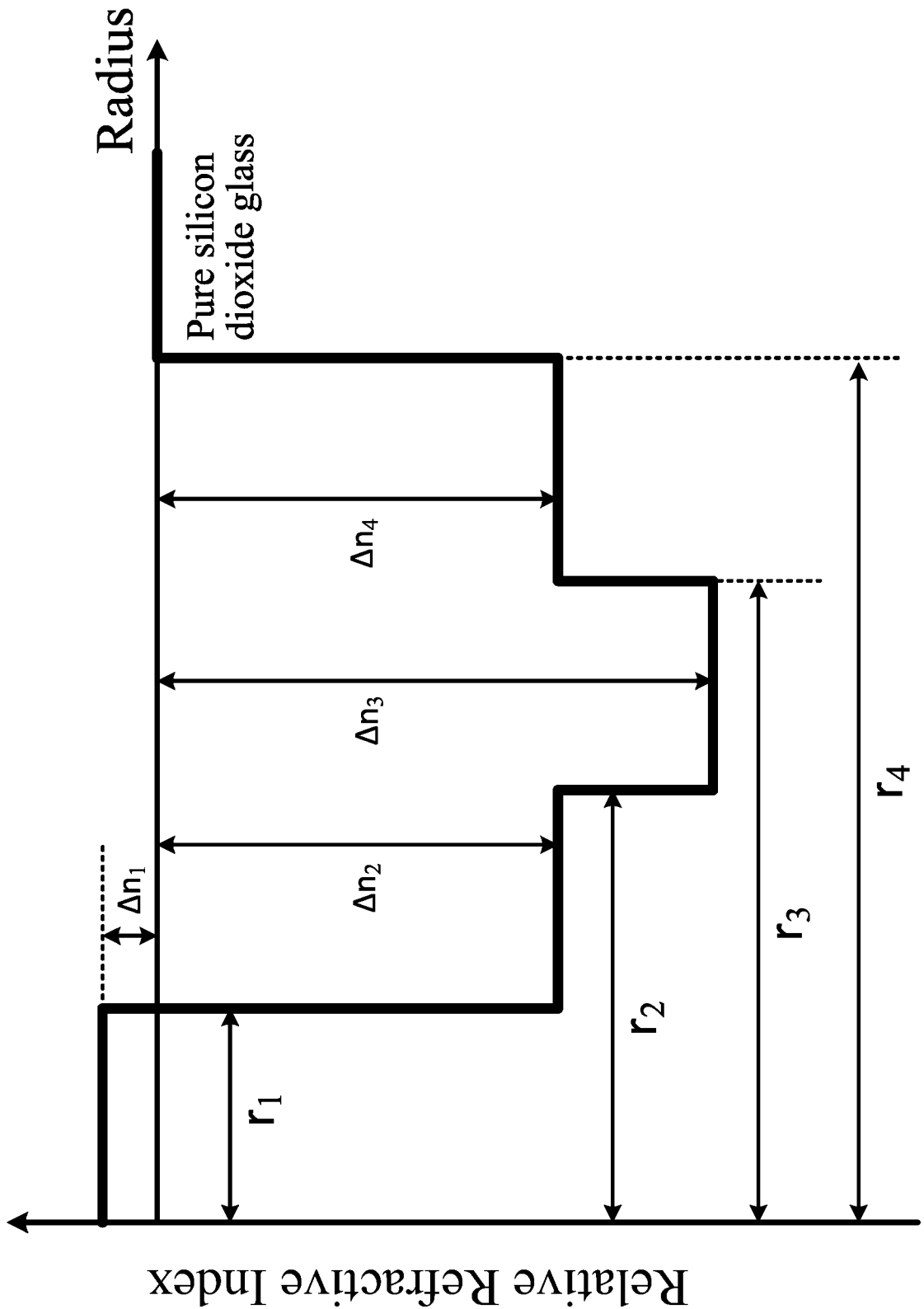

SINGLE-MODE FIBER WITH ULTRA LOW ATTENUATION

CROSS-REFERENCE TO RELATED APPLICATIONS

This application is a continuation application of International Patent Application No. PCT/CN2015/096109, filed Dec. 1, 2015, which itself claims priority to Chinese Patent Application No. 201510206602.7, filed Apr. 28, 2015 in the State Intellectual Property Office of P.R. China, which are hereby incorporated herein in their entireties by reference.

FIELD OF THE INVENTION

The present invention relates generally to an optical fiber, and more particularly, to a single-mode optical fiber with an ultra low attenuation.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

With the rapid increasing of IP network data services, operators have an increasing demand for transmission capacity. The capacity of a single fiber in an existing network is gradually approximating to the limit of 100 Tbps. Although commercial 100G transmission systems have already been available, how to further increase the transmission capacity on the basis of 100G transmission signals has drawn the attention of equipment manufacturers and operators.

A PM-QPSK modulation technology, a coherent detection technology and a DSP processing technology adapted in systems of 100 G decrease an optical signal-to-noise ratio (OSNR) margin of the systems to an order of magnitude equal to 10 G, and lower a requirement of the systems on optical fibers. Researches show that transmission can be performed over a distance greater than 1000 km in the 100 G systems by using ordinary G.652.D optical fibers or low loss and ultra low loss optical fibers. By using ultralow loss optical fibers, link distances can be extended by 35-40%, and the number of transmission stations can be decreased on some lines, thereby facilitating construction of all-optical networks. In addition, in certain systems having an optical amplifier span of a long distance around 100 km, ULL optical fibers can effectively reduce cross-span loss.

Because a limited OSNR, noise, and nonlinear problems are generated in transmission systems of 400 G, a transmission distance is limited. According to current test results of mainstream device providers, a transmission distance of systems of 400 G using dual-carrier and a modulation technology of 16QAM is only around ⅓ of that of systems of 100 G. Therefore, requirements on a system capacity and a transmission distance need to be comprehensively considered in construction of high-rate systems. From the perspective of line-side transmission devices, a multicarrier light source, higher order modulation, coherent detection, a high-speed DSP system, an error correction technology, and the like may be used to promote development of commercialized high-speed optical transmission systems. From the perspective of a link optical fiber technology, ultralow-loss optical fibers can improve a system OSNR and effectively extend a transmission distance.

Currently, attenuation of a conventional G.652.D optical fiber is generally 0.20 dB/km, and optical energy gradually decreases after being transmitted at a long distance. Therefore, a signal needs to be amplified again by means of relay. Compared with costs of optical fiber cables, related devices and maintenance costs of transmission stations account for above 70% of an entire link system. Therefore, an ultra low attenuation optical fiber can effectively extend a transmission distance, and reduce construction and maintenance costs. According to related calculation, if optical fiber attenuation decreases from 0.20 dB/km to 0.16 dB/km, construction costs of an entire link decrease by around 30%. In conclusion, development, design, and production of an ultralow attenuation optical fiber become an important subject in the field of optical fiber production.

Chinese Patent Application No. 201310394404 discloses a design of an ultra low attenuation optical fiber. Outer cladding layer of pure silicon dioxide is used in the ultra low attenuation optical fiber. However, because a typical step cross-section structure is used in the ultra low attenuation optical fiber, an optical fiber bending is not optimized by using a trench cladding layer design. In addition, a core layer of the ultralow attenuation optical fiber is not doped with Ge, and consequently, viscosity mismatch may occur when a preform is prepared. In addition, attenuation and bending ability thereof are relatively poor.

U.S. Patent Publication No. 2010/022533 discloses a design of pure-silicon core to obtain a smaller Rayleigh coefficient. Germanium and fluorine are not both doped in a core layer, and fluorine-doped silicon dioxide is used as an outer cladding layer in the design of pure-silicon core. In the design of pure-silicon core, complex viscosity match needs to be performed inside an optical fiber, and an extremely low speed is required in a belt grinding process, to avoid an attenuation increase caused because high-speed belt grinding results in a defect inside the optical fiber. Accordingly, a production process is very complex.

Therefore, a heretofore unaddressed need exists in the art to address the aforementioned deficiencies and inadequacies.

SUMMARY OF THE INVENTION

One of the objectives of the present invention is to provide an optical fiber with an ultralow attenuation. The single-mode fiber with the ultralow attenuation has low optical fiber production costs, a cable cut-off wavelength less than about 1260 nm, and better bending loss and dispersion performance, and is compatible with standard G.652.

In one aspect of the invention, a single-mode fiber with an ultralow attenuation includes a core layer and cladding layers surrounding the core layer.

In certain embodiments, the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer.

In certain embodiments, the core layer has a radius $r_1$ in a range of about 3.9 to 4.8 μm, and a relative refractive index difference $\Delta n_1$ in a range of about −0.08% to 0.10%.

In certain embodiments, the core layer is a germanium and fluorine co-doped silicon-dioxide glass layer, or a germanium-doped silicon-dioxide glass layer, where a doping contribution of germanium is in a range of about 0.02% to 0.10%.

In certain embodiments, the inner cladding layer has a radius $r_2$ in a range of about 9 to 14 μm, and a relative refractive index difference $\Delta n_2$ in a range of about −0.40% to −0.15%. The trench cladding layer has a radius $r_3$ in a range of about 13 to 25 μm, and a relative refractive index difference $\Delta n_3$ in a range of about −0.7% to −0.3%. The auxiliary outer cladding layer has a radius $r_4$ in a range of about 30 to 50 μm, and a relative refractive index difference $\Delta n_4$ in a range of about −0.4% to −0.15%. The outer cladding layer is a pure silicon dioxide glass layer.

In certain embodiments, the single-mode fiber has a mode field diameter at a wavelength of about 1310 nm being in a range of about 8.8 to 9.6 μm.

In certain embodiments, the single-mode fiber has a cable cut-off wavelength being less than or equal to about 1260 nm.

In certain embodiments, the single-mode fiber has a dispersion at a wavelength of about 1550 nm being less than or equal to about 18 ps/(nm*km), and a dispersion at a wavelength of about 1625 nm being less than or equal to about 22 ps/(nm*km).

In certain embodiments, the single-mode fiber has an attenuation at a wavelength of about 1310 nm being less than or equal to about 0.324 dB/km, preferably, being less than or equal to about 0.304 dB/km.

In certain embodiments, the single-mode fiber has an attenuation at a wavelength of about 1550 nm being less than or equal to about 0.184 dB/km, preferably, being less than or equal to about 0.174 dB/km.

In certain embodiments, the single-mode fiber has a microbending loss at a wavelength of about 1700 nm being less than or equal to about 5 dB/km.

Among other things, the present invention has the following beneficial effects.

A core layer doped with germanium is used, viscosity match inside an optical fiber is properly designed, defects in a preparation process of the optical fiber are reduced, and an attenuation parameter of the optical fiber is decreased, so that the optical fiber has ultralow attenuation performance.

Comprehensive performance parameters such as a cutoff wavelength, a bending loss, and a dispersion of the optical fiber in the present invention are great in wavebands of applications, and are compatible with standard G.652. The cable cut-off wavelength is sufficiently small, so that an optical signal is in a single mode when this type of optical fiber is applied to transmission in C band. In addition, the wide trench cladding structure improves the bending performance of the optical fiber.

The outer cladding layer structure in an outermost layer is formed of pure silicon dioxide, thereby reducing a weight of fluorine-doped glass in the optical fiber, and production costs of the optical fiber.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1 is a diagram of a refractive-index profile structure distribution according to an embodiment of the present invention.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

From a central axis of an optical fiber, according to changing of a refractive index, a layer closest to the axis is defined as a core layer, i.e., the core layer refers to a central area of a cross section of the fiber, and an outmost layer of the fiber, i.e., a pure-silicon-dioxide layer, is defined as an outer cladding layer of the fiber.

As used herein, a relative refractive index difference $\Delta n_i$ of a layer of a fiber is defined according to the following formula:

$$\Delta n_i = \frac{n_i - n_c}{n_c} \times 100\%$$

where $n_i$ is a refractive index of the corresponding layer, and $n_c$ is a refractive index of the outer cladding layer, that is, a refractive index of the pure silicon dioxide.

A contribution of doped Ge in the core layer of the optical fiber to the refractive index $\Delta Ge$ is defined according to the following equation:

$$\Delta Ge = \frac{n_{Ge} - n_c}{n_c} \times 100\%,$$

where $n_{Ge}$ is a change of the refractive index of the silicon dioxide glass caused by the doped substance Ge doped in the core layer, provided that the doped substance Ge doped in the core layer is doped in the pure silicon dioxide that includes no other doped substance.

Cable cut-off wavelength $\lambda_{cc}$: As defined in the IEC (International Electrotechnical Commission) standard 60793-1-44, a cable cutoff wavelength $\lambda_{cc}$ is a wavelength for which an optical signal no longer transmits as a single-mode signal after transmitting about 22 meters in an optical fiber. During a test, the optical fiber needs to be bent/wound into a circle (one round) with a radius of about 14 cm and two circles (two rounds) with a radius of 4 cm to obtain data.

The description will be made as to the embodiments of the present invention in conjunction with the accompanying drawings. In accordance with the purposes of this invention, as embodied and broadly described herein, this invention, in one aspect, relates to a single-mode fiber having an ultralow attenuation.

According to one embodiment of the invention as shown in FIG. 1, the optical fiber includes a core layer and cladding layers surrounding the core layer.

In certain embodiments, the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer.

In certain embodiments, the core layer has a radius $r_1$ in a range of about 3.9 to 4.8 μm, and a relative refractive index difference $\Delta n_1$ in a range of about −0.08% to 0.10%.

In certain embodiments, the core layer is a germanium and fluorine co-doped silicon-dioxide glass layer, or a germanium-doped silicon-dioxide glass layer, where a doping contribution of germanium is in a range of about 0.02% to 0.10%.

In certain embodiments, the inner cladding layer has a radius $r_2$ in a range of about 9 to 14 μm, and a relative refractive index difference $\Delta n_e$ in a range of about −0.40% to −0.15%. The trench cladding layer has a radius $r_3$ in a range of about 13 to 25 μm, and a relative refractive index difference $\Delta n_3$ in a range of about −0.7% to −0.3%. The auxiliary outer cladding layer has a radius $r_4$ in a range of about 30 to 50 μm, and a relative refractive index difference $\Delta n_4$ in a range of about −0.4% to −0.15%. The outer cladding layer is a pure silicon dioxide glass layer and has a radius of about 125 μm.

In certain embodiments, the single-mode fiber has a mode field diameter at a wavelength of about 1310 nm being in a range of about 8.8 to 9.6 μm.

In certain embodiments, the single-mode fiber has a cable cut-off wavelength being less than or equal to about 1260 nm.

In certain embodiments, the single-mode fiber has a dispersion at a wavelength of about 1550 nm being less than or equal to about 18 ps/(nm*km), and a dispersion at a wavelength of about 1625 nm being less than or equal to about 22 ps/(nm*km).

In certain embodiments, the single-mode fiber has an attenuation at a wavelength of about 1310 nm being less than or equal to about 0.324 dB/km, preferably, being less than or equal to about 0.304 dB/km.

In certain embodiments, the single-mode fiber has an attenuation at a wavelength of about 1550 nm being less than or equal to about 0.184 dB/km, preferably, being less than or equal to about 0.174 dB/km.

In certain embodiments, the single-mode fiber has a microbending loss at a wavelength of about 1700 nm being less than or equal to about 5 dB/km.

Table 1 lists a refractive index profile parameters of the single-mode fiber in embodiments of the present invention, where $\Delta Ge$ is a contribution of the doped Ge in the core layer to a refractive index. Table 2 shows corresponding optical transmission characteristic of the optical fibers listed in Table 1.

TABLE 1

Optical fiber profile parameters of the optical fibers according to embodiments of the present invention

| Fiber number | $r_1$ [μm] | $\Delta n_1$ [%] | $\Delta Ge$ | $r_2$ [μm] | $\Delta n_2$ [%] | $r_3$ [μm] | $\Delta n_3$ [%] | $r_4$ [μm] | $\Delta n_4$ [%] |
|---|---|---|---|---|---|---|---|---|---|
| 1 | 4.2 | 0.04 | 0.08 | 10 | −0.30 | 13.5 | −0.52 | 42 | −0.35 |
| 2 | 4.1 | 0.02 | 0.02 | 11.5 | −0.30 | 15.5 | −0.4 | 48 | −0.38 |
| 3 | 4.7 | 0 | 0.05 | 12.5 | −0.32 | 15.5 | −0.45 | 45 | −0.4 |
| 4 | 4.5 | 0.03 | 0.05 | 11 | −0.31 | 14.5 | −0.6 | 38 | −0.36 |
| 5 | 4.8 | 0.06 | 0.1 | 9 | −0.24 | 14 | −0.38 | 41 | −0.28 |
| 6 | 4.7 | 0.05 | 0.08 | 13 | −0.28 | 16 | −0.55 | 40 | −0.32 |
| 7 | 4 | 0 | 0.08 | 10 | −0.33 | 12.8 | −0.51 | 46 | −0.4 |
| 8 | 4.2 | −0.06 | 0.02 | 13 | −0.35 | 16.5 | −0.7 | 47 | −0.57 |
| 9 | 4.8 | −0.04 | 0.03 | 12 | −0.30 | 13.7 | −0.65 | 44 | −0.5 |
| 10 | 3.9 | −0.02 | 0.04 | 14 | −0.30 | 16.5 | −0.63 | 42 | −0.3 |

TABLE 2

Optical fiber performance parameters of the optical fibers according to embodiments of the present invention

| Fiber number | Mode field diameter @1310 | Cable cut-off wavelength | Zero dispersion | Attenuation coefficient @1310 nm | Attenuation coefficient @1550 nm | Microbending @1700 nm |
|---|---|---|---|---|---|---|
| 1 | 9 | 1242 | 1314 | 0.296 | 0.171 | 3 |
| 2 | 9.1 | 1206 | 1312 | 0.288 | 0.167 | 2.5 |
| 3 | 9.4 | 1231 | 1310 | 0.293 | 0.169 | 3.3 |
| 4 | 9.1 | 1254 | 1312 | 0.298 | 0.175 | 3.6 |
| 5 | 9.5 | 1237 | 1323 | 0.318 | 0.181 | 3.7 |
| 6 | 9.4 | 1250 | 1308 | 0.305 | 0.178 | 2.7 |
| 7 | 8.9 | 1222 | 1312 | 0.321 | 0.183 | 3.8 |
| 8 | 9.3 | 1258 | 1306 | 0.299 | 0.171 | 2 |
| 9 | 9.6 | 1231 | 1320 | 0.303 | 0.174 | 4.2 |
| 10 | 9.2 | 1246 | 1304 | 0.314 | 0.179 | 3.4 |

According to the present invention, an attenuation parameter of the optical fiber is decreased, so that the optical fiber has ultralow attenuation performance. Comprehensive performance parameters such as a cutoff wavelength, a bending loss, and a dispersion of the optical fiber in the present invention are great in wavebands of applications, and are compatible with standard G.652. In addition, the wide trench cladding structure improves the bending loss of the optical fiber.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A single-mode fiber with an ultralow attenuation, comprising:
a core layer and cladding layers, wherein the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer;
wherein the core layer is a germanium-doped silicon-dioxide glass layer, wherein a doping contribution of germanium is in a range of 0.02% to 0.10%;
wherein the core layer has a radius $r_1$ in a range of 3.9 to 4.7 μm, and a relative refractive index difference $\Delta n_1$ in a range of −0.08% to 0.10%;
wherein the inner cladding layer has a radius $r_2$ in a range of 9 to 14 μm, and a relative refractive index difference $\Delta n_2$ in a range of −0.35% to −0.15%;
wherein the trench cladding layer has a radius $r_3$ in a range of 13 to 25 μm, and a relative refractive index difference $\Delta n_3$ in a range of −0.7% to −0.3%;
wherein the auxiliary outer cladding layer has a radius $r_4$ in a range of 30 to 50 μm, and a relative refractive index difference $\Delta n_4$ in a range of −0.4% to −0.32%;
wherein the outer cladding layer is a pure silicon dioxide glass layer;
wherein a mode field diameter of the single-mode fiber at a wavelength of 1310 nm is in a range of 8.8 to 9.6 μm;
wherein a cable cut-off wavelength of the single-mode fiber is less than or equal to 1260 nm;
wherein an attenuation of the single-mode fiber at a wavelength of 1310 nm is less than or equal to 0.304 dB/km; and
wherein an attenuation of the single-mode fiber at a wavelength of 1550 nm is less than or equal to 0.174 dB/km.

2. The single-mode fiber according to claim 1, having a dispersion at a wavelength of 1550 nm being less than or equal to 18 ps/(nm*km), and a dispersion at a wavelength of 1625 nm being less than or equal to 22 ps/(nm*km).

3. The single-mode fiber according to claim 1, having a microbending loss at a wavelength of 1700 nm being less than or equal to 5 dB/km.

* * * * *